United States Patent
Peker et al.

(10) Patent No.: US 7,003,154 B1
(45) Date of Patent: Feb. 21, 2006

(54) ADAPTIVELY PROCESSING A VIDEO BASED ON CONTENT CHARACTERISTICS OF FRAMES IN A VIDEO

(75) Inventors: Kadir A. Peker, Paterson, NJ (US); Ajay Divakaran, Denville, NJ (US); Huifang Sun, Cranbury, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1129 days.

(21) Appl. No.: 09/715,639

(22) Filed: Nov. 17, 2000

(51) Int. Cl.
*G06K 9/34* (2006.01)
*H04N 5/91* (2006.01)
*G11B 27/00* (2006.01)

(52) U.S. Cl. .................. 382/173; 386/68; 715/723

(58) Field of Classification Search ............... 382/232, 382/173, 168, 236, 107, 172; 386/52, 68, 386/125, 81; 348/700; 345/716, 719, 721, 345/723; 375/240.16; 715/723

See application file for complete search history.

(56) References Cited

U.S. PATENT DOCUMENTS

| | | | | |
|---|---|---|---|---|
| 5,754,728 A | * | 5/1998 | Nakajima et al. | ............. 386/68 |
| 6,424,789 B1 | * | 7/2002 | Abdel-Mottaleb | ........... 386/52 |
| 6,597,738 B1 | * | 7/2003 | Park et al. | ............. 375/240.16 |
| 6,611,653 B1 | * | 8/2003 | Kim et al. | ..................... 386/68 |
| 6,665,423 B1 | * | 12/2003 | Mehrotra et al. | ........... 382/107 |

OTHER PUBLICATIONS

"Coding of Moving Pictures and Audio"; International Organization for Standardization; ISO/IEC JTC1/SC29/WG11/, MPEG99/M5365, Dec., 1999/Maui.

* cited by examiner

*Primary Examiner*—Wenpeng Chen
(74) *Attorney, Agent, or Firm*—Dirk Brinkman; Andrew J. Curtin

(57) ABSTRACT

A system and method for temporally processing an input video including input frames. Each frame has an associated frame play time, and the input video has a total input video play time that is a sum of the input frame play times of all of the input frames. Each of the input frames is classified according to a content characteristic of each frames. An output frame play time is allocated to each of the input frames that is based on the classified content characteristic of each of the input frames to generate a plurality of output frames that form an output video.

27 Claims, 2 Drawing Sheets

ADAPTIVELY PROCESSING A VIDEO BASED ON CONTENT CHARACTERISTICS OF FRAMES IN A VIDEO

FIELD OF THE INVENTION

This invention relates generally to processing videos, and more particularly to adaptively processing videos based on characteristics of content of frames of the video.

BACKGROUND OF THE INVENTION

Standard Processing Techniques

Basic standards for processing a video encoded as a digital signal have been adopted by the Motion Picture Expert Group (MPEG). The MPEG standards achieve high data compression rates by developing information for full frames of the video only every so often. The full frames, i.e., intra-coded frames, are often referred to as "I-frames" or "reference frames," and contain full frame information independent of any other frames. Image difference frames, i.e., inter-coded frames, are often referred to as "B-frames" and "P-frames," or as "predictive frames," and are encoded between the I-frames and reflect only image differences i.e., residues with respect to the reference frame.

Typically during the processing, each frame of a video is partitioned into smaller blocks of picture element, i.e., pixel data. Each block is subjected to a discrete cosine transformation (DCT) function to convert the statistically dependent spatial domain pixels into independent frequency domain DCT coefficients. Respective 8×8 or 16×16 blocks of pixels, referred to as "macro-blocks," are subjected to the DCT function to provide the encoded signal. The DCT coefficients are usually energy concentrated so that only a few of the coefficients in a macro-block contain the main part of the picture information. For example, if a macro-block contains an edge boundary of an object, then the energy in that block, after transformation, as represented by the DCT coefficients, includes a relatively large DC coefficient and randomly distributed AC coefficients throughout the matrix of coefficients.

A non-edge macro-block, on the other hand, is usually characterized by a similarly large DC coefficient and a few adjacent AC coefficients which are substantially larger than other coefficients associated with that block. The DCT coefficients are typically subjected to adaptive quantization, and then are run-length and variable-length encoded. Thus, the macro-blocks of transmitted data typically include fewer than an 8×8 matrix of code words.

The macro-blocks of inter-coded frame data, i.e., encoded P or B frame data, include DCT coefficients which represent only the differences between predicted pixels and actual pixels in the macro-block. Macro-blocks of intra-coded and inter-coded frame data also include information such as the level of quantization employed, a macro-block address or location indicator, and a macro-block type. The latter information is often referred to as "header" or "overhead" information. This provides good spatial compression of the video.

Each P-frame is predicted from the last most occurring I- or P-frame. Each B-frame is predicted from an I- or P-frame between which the B-frame is disposed. The predictive coding process involves generating displacement vectors, often referred to as "motion vectors," which indicate a magnitude of the displacement of the macro-block of an I-frame that most closely matches the macro-block of the B- or P-frame currently being coded. The pixel data of the matched block in the I frame are subtracted, on a pixel-by-pixel basis, from the block of the P- or B-frame being encoded, to develop the residues. The transformed residues and the vectors form part of the encoded data for the P- and B-frames. This provides good temporal compression.

Video Analysis

Video analysis can be defined as processing a video with the intention of understanding the content of the video. The understanding of the video can range from a "low-level" syntactic understanding, such as detecting segment boundaries or scene changes in the video, to a "high-level" semantic understanding, such as detecting a genre of the video. The low-level understanding can be achieved by analyzing low-level features, such as color, motion, texture, shape, and the like, to generate content descriptions. The content description can then be used to index the video. The high-level understanding can be encoded at the source, or in some instances derived from low-level features, see Yeo et al. *"Rapid scene analysis on compressed videos,"* IEEE Transactions on Circuits and Systems for Video Technology, vol. 5:pp 533–544, 1995, Meng et al. *"CVEPS: A compressed video editing and parsing system,"* ACM Multimedia Conference, 1996, and Chang et al. *"Compressed-domain techniques for image/video indexing and manipulation,"* IEEE International Conference on Image Processing, Volume-I, pp. 314–317, 1995.

Video Summarization

Video summarization can be defined as a process that produces a compact representation of a video that still conveys the semantic essence of the video. The compact representation can include key frames or key segments, or a combination of key frames and segments. As an example, a video summary of a tennis match can include a small key segment and a key frame. The key segment captures both of the players in action during the very last winning return, and the key frame captures the winner with the trophy. A more detailed and longer summary could include all frames of the match game or point. While it is certainly possible to generate such a summary manually, this is tedious and costly.

Automatic video summarization methods are well known, see S. Pfeiffer et al. in *"Abstracting Digital Movies Automatically,"* J. Visual Comm. Image Representation, vol. 7, no. 4, pp. 345–353, December 1996, and Hanjalic et al. in *"An Integrated Scheme for Automated Video Abstraction Based on Unsupervised Cluster-Validity Analysis,"* IEEE Trans. On Circuits and Systems for Video Technology, Vol. 9, No. 8, December 1999.

Most known video summarization methods focus on color-based summarization. Pfeiffer et al. also uses motion, in combination with other features, to generate video summaries. However, their approach merely uses a weighted combination that overlooks possible correlation between the combined features.

While color descriptors are robust, they do not include the motion characteristics of the video sequence by definition. On the other hand, motion descriptors tend to be less robust to noise than color descriptors and have generally not been as widely used for summarization.

The level of motion activity in a video can be a measure of how much the scene acquired by the video is changing. Therefore, the motion activity can be considered a measure of the "summarizability" of the video. For instance, a high speed car chase will certainly have many more "changes" in it compared to a scene of a news-caster, and thus, the high speed car chase scene will require more resources for a visual summary than would the news-caster scene.

It is desired to adaptively process a video using content characteristics of frames in the video. During the processing, play time for the frames of the video should be allocated on a basis of content characteristics.

SUMMARY OF THE INVENTION

The invention provides a system and method for temporally processing an input video including input frames. Each frame has an associated frame play time, and the input video has a total input video play time that is a sum of the input frame play times of all of the input frames. Each of the input frames is classified according to a content characteristic of each frame. An output frame play time is allocated to each of the input frames that is based on the classified content characteristic of each of the input frames to generate a plurality of output frames that form an output video.

The content characteristic can be on low-level features and/or high-level features of each of the input frames, and the allocated play time is dynamically varied while processing the video. The allocation can be done by sampling the frames, or by varying the frame rate.

DETAILED DESCRIPTION OF THE PREFERRED EMBODIMENT

Figure 1:
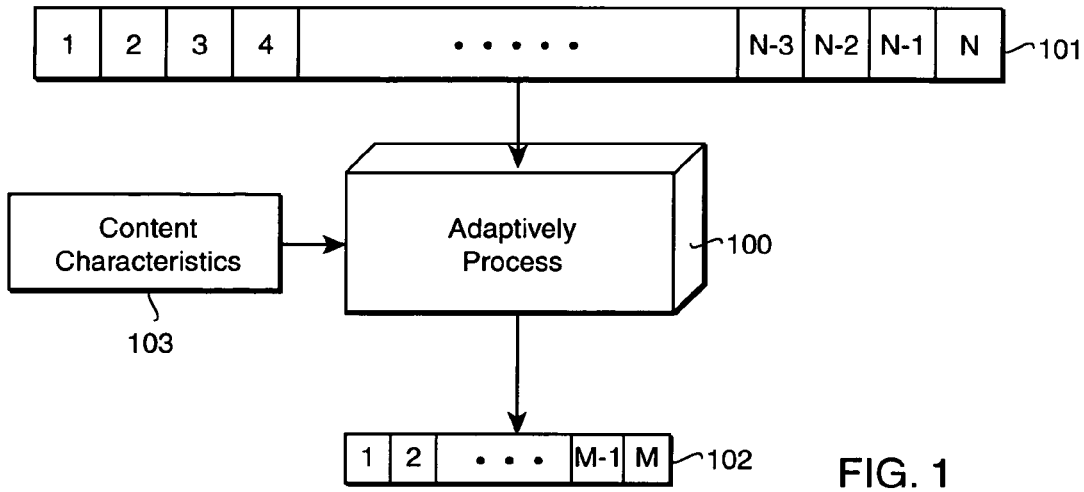
FIG. 1 is a block diagram of a system for adaptively processing videos according to the invention.

FIG. 1 is a top-level view of our system and methods 100 for adaptively processing a video based on selected characteristics 103 or features extracted from the content of a video. An input video 101 to our system and methods 100 is a temporally ordered set of frames V(1,2, . . . , N-1, N) that comprise the video.

The system generates an output video 102 that is dependent on the selected characteristics of the video. In one embodiment of the invention, the output video 102 is a temporally ordered set of frames v(1,2, . . . , M-1, M) where v∈V.

The invention allocates play time to the frames of the video according to the measured characteristics.

As an advantage of the invention, the amount of play time that is allocated to any selected frame can span a continuum from no time—the frame is not played at all, a short time—the frame is sped up, a normal play time, a long time—the frame is slowed down, to the length of time of the output video—in which case a single frame represents the entire input video.

Our invention can dynamically process the video while the video is played. In other words, the user determines how much time to allocate to each portion of the video in real-time. Alternatively, the output video can be generated for later playing.

The selected characteristics can be based on low-level (syntactic) features, or high-level (semantic) features, or combinations of various high- and low-level features.

Low-level features can include color, texture, brightness, contrast, spectral parameters, local and global motion, activity, trajectory and its parameters, speed, acceleration, object shape, object size, number of objects, number of faces, pitch, volume, tempo, to name some examples. High-level features can include genre, dramatic intensity, humor content, action level, beauty, lyricism, musical intensity, educational quality, profundity, nudity, linguistic class and so forth, see Divakaran et al. "*Report on Validation Experiment on Ordered Relation Graphs,*" ISO/IEC JTC1/SC29/WG11/MPEG99/M5365, December 1999.

Adaptive Sampling

Figure 2:
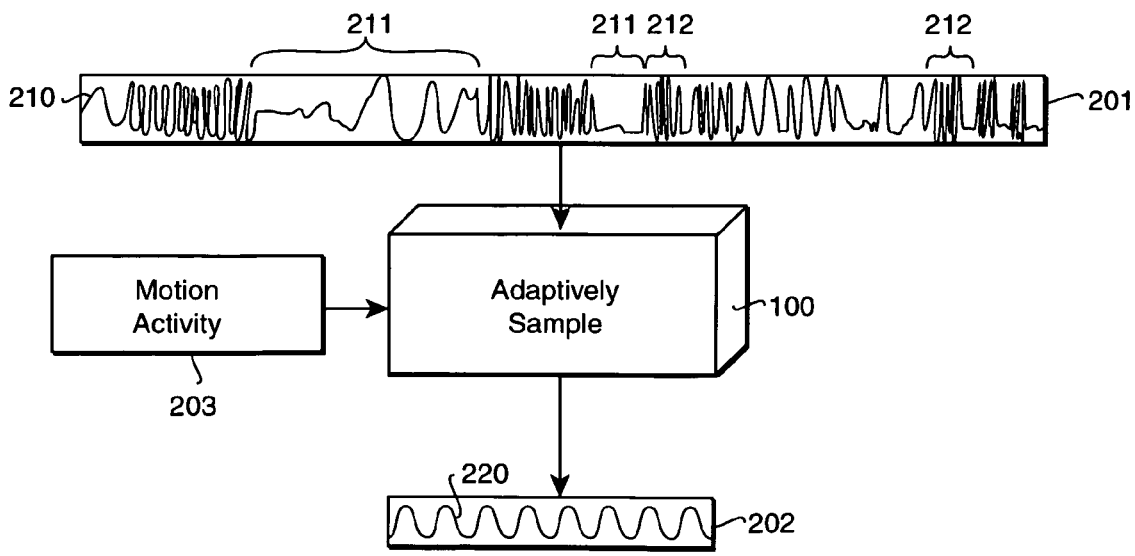
FIG. 2 is a block diagram of an adaptive process based on motion activity characteristics of content of the video.

FIG. 2 shows how the invention operates when the measured characteristic is motion activity 203. The line 210 represents the relative motion activity in the input video 201 over time. When the line 210 is substantially flat, the relative intensity of the motion activity is low, e.g., during frames 211. When the line fluctuates rapidly, the relative intensity of the motion activity is high, e.g., during frames 212. The desired output video 202 has a predetermined constant level of motion activity as represented by line 220. In other words, the user of the system has determined that the video should be viewed at some constant level of motion activity. It should be understood, that different users can select different levels of activity at which they desire to view the video. For example, a viewer that is familiar with the content can view and absorb the video at a much higher rate than someone who is totally unfamiliar with the content.

Therefore, the system 100 samples frames 211 at a higher rate, and frames 212 are sampled at a lower rate. In other words, the sampling rate (down-sampling or up-sampling) is adaptive to the measured level of motion activity. Low-level activities are sped up, and high-level activities are sampled at a normal rate or slowed down. In fact, if the level of motion activity is too high to enable normal perception, then the frames 212 can be up-sampled. For example, a one second sequence of thirty frames can be expanded to a ten second sequence of three-hundred frames by showing each frame ten times.

As a refinement, the additional frames can be interpolated from one frame to the next to smooth the motion of the up-sampled frames. If the video is in MPEG format, then the interpolation can be done by generating additional intra-frames. In this case, it will appear as if the video is played in slow motion. In any case, the sampling rate determines how much play time is allocated, on a continuum, on a per frame basis.

In an alternative embodiment, the level of motion activity is adaptively altered by changing the frame rate. Increasing the frame rate, decreases the amount of play time that is allocated to each of the frames. An increased frame rate results in faster movement, i.e., the faster the frame rate, the faster the objects in the video appear to move, and therefore the larger the motion vectors. Decreasing the frame rate has the opposite effect. Therefore, the frame rate varies with the level of motion activity.

In some sense, sampling can be considered extreme variations on changing the frame rate. If the frame rate is increased, then the play time of each of the frames is decreased. Thus, if the instantaneous frame rate is infinite, then the play time is decreased to zero, and the frame is, in effect deselected or not sampled. Likewise as the frame's play time is increased, the instantaneous frame is decreased. Thus, if the frame rate is decreased to a very low number, lets say one frame per ten seconds, then the video is reduced to a sequence of one or more stills.

Measure of Motion Activity

One measure of motion activity can be the average of the magnitude of the motion vectors, see Peker et al. "*Automatic measurement of intensity of motion activity,*" Proceedings of SPIE Conference on Storage and Retrieval for Media Databases, January 2001. However, there are many variations possible, depending on the application. For instance, we use the average motion vector magnitude as a measure of motion activity to favor moving segments with moving regions of significant size and activity, and we use the magnitude of the shortest motion vector as a measure of motion activity to favor segments with significant global motion. It should be understood that other statistical moments such as standard deviation, median, variance, skew, and kurtosis can also be used.

Guaranteed Minimum Level of Motion Activity

The sampling or frame rate processing steps described above can be adapted to provide a guaranteed minimum level of activity, as opposed to a constant level of activity, as described above. Then, the guaranteed minimum level of activity can be used as a "control knob" that can go from the continuum of just a one frame output video, to the entire input video being the output video. In the latter case, the guaranteed minimum level of activity is equal to the minimum activity level present in the input video. Thus, the size of the output video can range from a single frame to the entire input video.

The average motion vector magnitude provides a convenient linear measure of motion activity. Decreasing the allocated play time by a factor of two, for example, doubles the average motion vector magnitude. The average motion vector magnitude $\hat{r}$ of the input video of N frames can be expressed as:

$$\hat{r} = \left(\frac{1}{N}\right)\sum_{i=1}^{N} r_i,$$

where the average motion vector magnitude of frame i is $r_i$.

For a target level of motion activity $r_{target}$ in the output video, the relationship between the length $L_{output}$ of the output video and the length $L_{input}$ of the input video can be expressed as:

$$L_{output} = \frac{\hat{r}}{r_{target}} L_{input}$$

However, the target motion activity measure does not allow us to span the continuum from the entire video to a one-frame output video.

Therefore, we use the guaranteed minimum activity method to achieve this continuum. In this method, we speed up or decrease allocated play time of all portions of the input video that are lower than the targeted minimum motion activity $r_{target}$ so that all these portions attain the targeted motion activity using the above formulations. The portions of the input video that exceed the targeted motion activity can remain unchanged.

In one extreme, where the guaranteed minimum activity is equal to the minimum motion activity in the input video, the entire input video becomes the output video. When the guaranteed minimum activity exceeds the maximum motion activity of the input video, the problem reduces to the above constant activity case. In the other extreme, where the targeted level of activity is extremely high, the output video includes only one frame of the input video as a result of down-sampling or fast play.

The length of the output video can be determined as follows. First, classify all of the frames of the input video into two sets. A first set $S_{higher}$ includes all frames j where the motion activity is equal to or higher than the targeted minimum activity. The second set $S_{lower}$ includes all frames k where the motion activity is lower than the targeted motion activity. Then, the length of the input video is expressed by:

$$L_{input} = L_{higher} + L_{lower}.$$

The average motion activity $\hat{r}_{lower}$ of frames j that belong to the set $S_{lower}$ is $$\hat{r}_{lower} = \left(\frac{1}{N_{lower}}\right)\sum_{j}^{N_{lower}} r_j, \text{ and}$$

the length of the output converted is $$L_{output} = \left(\frac{\hat{r}_{lower}}{r_{target}}\right) L_{lower} + L_{higher}.$$

It is now apparent that the guaranteed minimum activity approach reduces to the constant activity approach because when $L_{higher}$ becomes zero, the entire input video needs to be processed.

The guaranteed minimum motion activity method can now proceed as follows. First we assign actual motion activity values, in terms of a continuous descriptor, to each level of motion activity. Second, we express the average motion activity of the input video as a temporal histogram of the motion activity as described in U.S. patent application Ser. No. 10/217,918 "Activity Descriptor for Video Sequence," filed by Divakaran et al. on Aug. 13, 2002, and incorporated herein by reference, which is a continuation of now abandoned U.S. patent application Ser. No. 09/406,444, filed on Sep. 27, 1999. The temporal histogram directly indicates what frames of the input video have a level of motion activity that is lower than the targeted activity in a quantized fashion so the above classification can be performed. Third, we associate the temporal histogram with the actual motion values, and apply the guaranteed minimum activity method as expressed in the above formulations to determine the relationship between the length of the output video and the targeted level of motion activity.

Processing of Video

Figure 3:
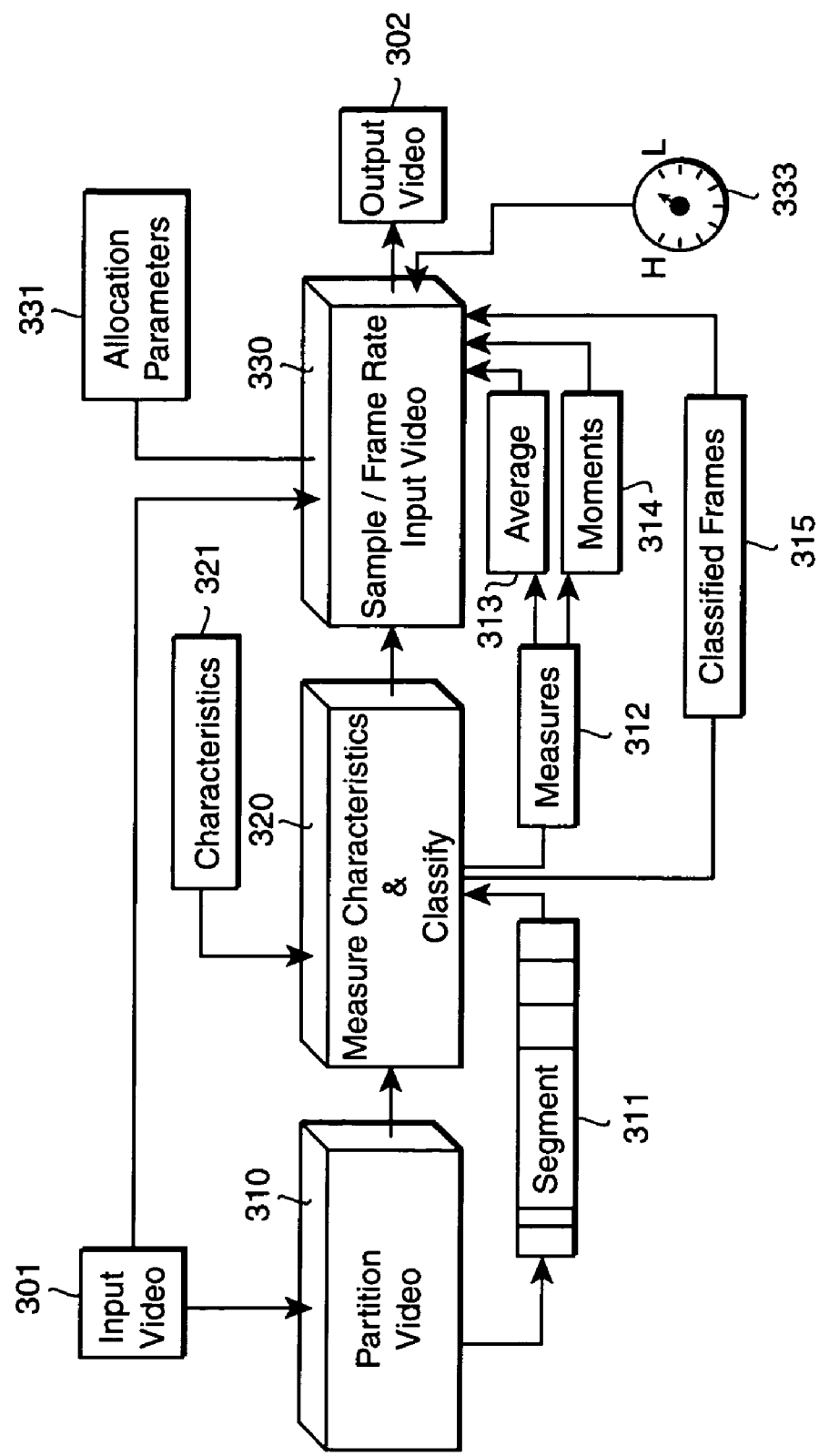
FIG. 3 is a flow diagram of a method for processing a video according to the invention.

FIG. 3 shows the steps involved in the generalized for temporally processing the input video. Step 310 optionally partitions the input video 301 into "shots" or segments 311 using known scene change detection techniques. This is based on the observation that dominant characteristics are frequently clustered by segments, shots, or scenes. Then, different feature extraction techniques can be applied depending on the dominant characteristics of a particular segment.

Step 320 measures selected characteristics 321, such as motion activity, color, shape, etc., of the content of the frames of each of the segments 311 using any of the methods as described above.

The measures 312 are used to classify the frames 315 of the each of the segments 311. The measures 312 can include the average 313, or other derived statistical moments 314.

Step 330 temporally and adaptively allocates play time to each frame according to the classification of the frames. The allocated play time can be determined by selectively sampling (down- or up-sampling) the frames, or by varying the frame rate. The allocation of play time can be constrained by user selected allocation parameters 331 such as total play time for the output video 302, constant level of motion activity, minimum level of motion activity, and the like. It should be understood that varied allocation of play time by either sampling or frame rates can be combined while composing the output video 302. It should be understood that the allocation of play time can be dynamically varied by controls 333 which selects a level of what ever the selected characteristics are.

Note, our invented technique is distinguished from prior art techniques that directly vary play time, such as fast-forward, and slow-motion. Those techniques directly vary the frame rate independent of the content. In contrast, we vary the desired level of characteristic, e.g., motion and activity or color, and then indirectly vary the frame rate accordingly.

Processing Controlled by Other Characteristics

As stated above, the adaptive processing can be controlled by other characteristics of the video. For example, the characteristics 321 can be a dominant color or colors. For example, if the selected dominant color in the frames is to be green, the video is sampled at a higher rate then when there is little or no green in the video. This is useful in processing videos of sporting events. The processed video can discard "crowd" scenes or commercials, and then, only frames reflecting activities on the playing field are incorporated into the output video.

If the dominant color is skin color, then only frames including people are sampled. For example, if a frame has more than 25% skin color then the frame is selected so that the output video is more likely to have scenes where people are talking, see U.S. Pat. No. 5,940,530 "Backlit scene and people scene detecting method and apparatus and a gradation correction apparatus" issued to Fukushima, et al. on Aug. 17, 1999.

Object shape can also be used as a content characteristic. For example, selectively sample frames with a ball-like object to summarize a tennis match. Note, MPEG-4 provides elementary bit streams on a per object basis. Trajectory can be used to discard frames with predominantly linear motion, and keep frames with a higher level of non-linear motion. Texture can be used to sample frames with brick buildings, foliage, waves, or any other selected texture, see Brodatz, "*Textures-A Photographic Album for Artists and Designer*," Dover, N.Y. 1966 for standard textures.

Frame Rate

In theory, it is possible to play the video at any number of different frame or sampling rates. However, the temporal Nyquist rate puts limits on how fast the video can be played without becoming imperceptible to the viewer. A simple way of visualizing this is with a video sequence illuminated by a light that is strobed. When the frame rate is equal to the rate of strobing, the scene will appear stationary. Thus, the maximum level of motion activity in a particular segment of the video determines how fast the video can be played. Furthermore, as the rate of sampling decreases, (or the frame rate increases) the segments of the video will be reduced to a set of "still" frames or a "slide show." Depending on the content and the level of motion activity, a cross-over point can be determined where it becomes more efficient to play the video segment as a slide show rather than a "moving" video.

Applications

We have applied our invention to a number of videos with diverse contents. For example, a video acquired from a surveillance camera directed at a highway produces very satisfactory results. Segments of the video where there is very little traffic are skipped over rapidly, to allow the viewer to focus on those segments with significant traffic. The invention works equally well with videos of sporting events, or news broadcasts.

Our invention is also useful for video browsing. The amount of video that is now accessible is enormous. Our methods are well suited for local content, and indispensable for browsing remote content, e.g., content accessed over the Internet, because we enable a more efficient use of the limited available bandwidth.

Our invention is extremely useful for surveillance applications. For example, a set of surveillance cameras in a building can acquire many thousands of hours of videos in a day or so. Normally, most of the videos will have a constant characteristic, that is a low-level of motion activity or color/audio change, more likely none at all. Only a small portion of the videos will record any significant "security" events. Therefore, our invention allows a user to quickly access those portions of the videos that warrant closer inspection.

We can also increase the efficacy of our methods by reducing the amount of noise in the motion vectors. We can also combine various video characteristics, such as motion activity and color to refine the output video.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for temporally processing an input video including a plurality of input frames, each of the input frames having an associated input frame play time, and the input video having a total input video play time that is a sum of the input frame play times of all of the input frames, comprising:

classifying each of the plurality of input frames according to a content characteristic of each of the input frames; and allocating an output frame play time to each of the plurality of input frames that is based on the content characteristic of each of the input frames to generate a plurality of output frames.

2. The method of claim 1 wherein the content characteristic is based on low-level features of each of the input frames.

3. The method of claim 2 wherein the low-level features are selected from a group consisting of motion vectors, color, texture, brightness, contrast, spectral parameters, local and global motion, activity, trajectory, speed, acceleration, object shape, object size, number of objects, number of faces, pitch, volume, tempo, and combinations thereof.

4. The method of claim 1 wherein the content characteristic is based on high-level features of each of the input frames.

5. The method of claim 4 wherein the high-level features are selected from a group consisting of genre, dramatic intensity, humor content, action level, beauty, lyricism, musical intensity, educational quality, profundity, nudity, linguistic class, and combinations thereof.

6. The method of claim 1 wherein the allocating of the play time is dynamically varied while processing the video.

7. The method of claim 1 wherein the allocated output frame play time of each of the output frames is determined by sampling the input frames.

8. The method of claim 7 wherein the sampling is a down-sampling of the input frames.

9. The method of claim 7 wherein the sampling is an up-sampling of the input frames.

10. The method of claim 9 wherein up-sampled output frames are interpolated from the input frames.

11. The method of claim 7 wherein the sampling is a combination of down-sampling and up-sampling of the input frames.

12. The method of claim 1 wherein the allocated output frame play time of each of the output frames is determined by an output frame rate of the output frame.

13. The method of claim 12 wherein the output frame rate is increased for selected input frames.

14. The method of claim 12 wherein the output frame rate is decreased for selected input frames.

15. The method of claim 1 further comprising:
measuring the content characteristics of each of the plurality of input frames to determine the classification.

16. The method of claim 15 further comprising:
computing a statistical moment for the content characteristics to determine the classification.

17. The method of claim 1 wherein the allocation of play time is based on a constant level of motion activity in the plurality of output frames.

18. The method of claim 1 wherein the allocation of play time is based on a guaranteed minimum level of activity in the plurality of output frames.

19. The method of claim 1 further comprising:
partitioning the input video into a plurality of segments, and processing the input video on a per segment basis.

20. The method of claim 1 wherein still frames are selected for the plurality of output frames when the allocated output frame play time exceeds a temporal Nyquist limit.

21. The method of claim 1 further comprising:
allocating a total output video play time for an output video; and
allocating the output frame play times so that a sum of the output frame play times of the plurality of output frames is equal to the total output video play time of the output video.

22. The method of claim 21 wherein the allocated play time of a particular frame can range on a continuum from zero time to a length of time of the output video.

23. The method of claim 21 wherein the allocation of play time is based on a motion activity in the output video, and a measure of motion activity is an average of magnitudes of motion vectors of the frames.

24. The method of claim 23 where the average motion vector magnitude $\hat{r}$ of the input video of N frames is expressed as:

$$\hat{r} = \left(\frac{1}{N}\right)\sum_{i=1}^{N} r_i,$$

where an average motion vector magnitude of frame i is $r_i$.

25. The method of claim 24 wherein a relationship between a length $L_{output}$ of the output video and a length $L_{input}$ of the input video is expressed as $$L_{output} = \frac{\hat{r}}{r_{target}} L_{input}$$

for a target level of motion activity $r_{target}$ in the output video.

26. The method of claim 25 further comprising:
classifying all of frames j of the input video having the motion activity equal to or higher than a targeted level of minimum motion activity into a first set $S_{higher}$ having a length $L_{higher}$;
classifying all of frames k of the input video having the motion activity lower than the targeted level of minimum motion activity into a second $S_{lower}$ having a length $L_{lower}$;
summing $L_{higher}+L_{lower}$ to determine a $L_{input}$ of the input video to determine a length of the output video by $$L_{output} = \left(\frac{\hat{r}_{lower}}{r_{target}}\right) L_{lower} + L_{higher}.$$

27. A system for temporally processing an input video including a plurality of input frames, each of the input frames having an associated input frame play time, and the input video having a total input video play time that is a sum of the input frame play times of all of the input frames, comprising:
means for classifying each of the plurality of input frames according to a content characteristic of each of the input frames;
means for allocating a total output video play time for an output video; and
means for allocating an output frame play time to each of the plurality of input frames that is based on the content characteristic of each of the input frames to generate a plurality of output frames so that a sum of the output frame play times of the plurality of output frames is equal to the total output video play time of the output video.

* * * * *